United States Patent
Takahashi et al.

(10) Patent No.: US 7,610,461 B2
(45) Date of Patent: Oct. 27, 2009

(54) STORAGE SYSTEM WITH MAINFRAME AND OPEN HOST PERFORMING REMOTE COPYING BY SETTING A COPY GROUP

(75) Inventors: Masamitsu Takahashi, Chigasaki (JP); Koji Ozawa, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 458 days.

(21) Appl. No.: 11/527,477

(22) Filed: Sep. 27, 2006

(65) Prior Publication Data

US 2008/0028172 A1 Jan. 31, 2008

(30) Foreign Application Priority Data

Jul. 31, 2006 (JP) ............... 2006-207457

(51) Int. Cl.
*G06F 12/16* (2006.01)
*G06F 13/12* (2006.01)
(52) U.S. Cl. .......................... 711/162; 714/6
(58) Field of Classification Search ............ 711/162
See application file for complete search history.

(56) References Cited

U.S. PATENT DOCUMENTS

| | | | | |
|---|---|---|---|---|
| 6,052,758 | A * | 4/2000 | Crockett et al. ............ | 711/113 |
| 6,480,953 | B1 * | 11/2002 | Hughes ...................... | 713/1 |
| 2005/0081098 | A1 * | 4/2005 | Demaray et al. ............ | 714/15 |
| 2005/0149645 | A1 * | 7/2005 | Tsuruta ...................... | 710/22 |
| 2005/0240634 | A1 | 10/2005 | Iwamura et al. | |
| 2006/0048014 | A1 | 3/2006 | Takahashi et al. | |
| 2007/0168713 | A1 * | 7/2007 | Kern et al. ................. | 714/12 |

FOREIGN PATENT DOCUMENTS

| | | |
|---|---|---|
| EP | 1589428 A1 | 10/2005 |
| EP | 1622019 A1 | 2/2006 |
| EP | 1675007 A1 | 6/2006 |

OTHER PUBLICATIONS

European Search Report dated Jul. 1, 2009 for corresponding European Patent Application.

* cited by examiner

*Primary Examiner*—Matt Kim
*Assistant Examiner*—Hal Schnee
(74) *Attorney, Agent, or Firm*—Brundidge & Stanger, P.C.

(57) ABSTRACT

If the pair state of a certain volume pair in one copy group is a fault state which has changed due to occurrence of a fault in the volume pair, then a write holding state is set for the copy group, and after setting the write holding state, the pair states of all the other volume pairs belonging to the copy group are set to a copy halt state. When setting the write holding state, and when executing setting of the copy halt setting state, commands from an open host are not necessary.

6 Claims, 14 Drawing Sheets

FIG. 5

REMOTE COPY PAIR CONTROL TABLE

| VOLUME # | COPY TARGET DEVICE # | COPY TARGET VOLUME # | COPY TYPE | GROUP # | PAIR STATE | MF/OPEN | ... |
|---|---|---|---|---|---|---|---|
| 0x0000 | 12345 | 0x0000 | SYNCHRONOUS | 0x03 | Duplex | MF | ... |
| 0x0001 | NULL | NULL | NULL | NULL | Simplex | NULL | ... |
| 0x0002 | 12345 | 0x0002 | SYNCHRONOUS | 0x03 | Duplex | OPEN | ... |
| 0x0003 | 22550 | 0x0203 | ASYNCHRONOUS | 0x12 | Duplex | MF | ... |
| .. | .. | .. | .. | .. | .. | .. | ... |
| 0xFEFF | NULL | NULL | NULL | NULL | Simplex | NULL | ... |
| .. | .. | .. | .. | .. | .. | .. | ... |

FIG. 6

SYNCHRONOUS REMOTE COPY GROUP CONTROL TABLE

| GROUP # | CONTROL INFORMATION | I/O HOLDING INITIATION TIME | TIMEOUT TIME | ... |
|---------|---------------------|------------------------------|--------------|-----|
| 0x00    | 1                   | 20:34:15                     | 120          | ... |
| 0x01    | 0                   | NULL                         | NULL         | ... |
| 0x02    | 0                   | NULL                         | NULL         | ... |
| ..      | ..                  | ..                           | ..           | ... |
| 0x7F    | 0                   | NULL                         | NULL         | ... |

FIG. 7

SYNCHRONOUS REMOTE COPY EXTENSION GROUP CONTROL TABLE

| VALID | GROUP # | NUMBER OF DEVICES | DEVICE #1 | COMMAND DEVICE VOLUME #1 | DEVICE #2 | COMMAND DEVICE VOLUME #2 |
|---|---|---|---|---|---|---|
| 1 | 0x00 | 1 | 67890 | 0x0254 | NULL | NULL |
| ... | ... | | | | | |

STORAGE SYSTEM WITH MAINFRAME AND OPEN HOST PERFORMING REMOTE COPYING BY SETTING A COPY GROUP

CROSS-REFERENCE TO PRIOR APPLICATION

This application relates to and claims priority from Japanese Patent Application No. 2006-207457, filed on Jul. 31, 2006, the entire disclosure of which is incorporated herein by reference.

BACKGROUND OF THE INVENTION

1. Field of the Invention

This invention relates to remote copying from a primary volume of a primary storage system to a secondary volume of a secondary storage system.

2. Description of the Related Art

Technology for remote copying has for example been disclosed in Japanese Patent Laid-open No. 2005-332354. According to this technology, a computer system has a host computer, a plurality of first storage systems having a plurality of first logical disks, and a plurality of second storage systems having a plurality of second logical disks. The first logical disks and second logical disks form pairs, and each pair belongs to either a first copy group or to a second copy group. When remote copying is halted for each copy group, first a copy group is specified, and then pairs belonging to the copy group are specified. Then, the first storage system, having the first logical disk of a specified pair, halts remote copying for the specified pair.

SUMMARY OF THE INVENTION

There are two types of remote copying, using a synchronous method and using an asynchronous method.

A synchronous method is a method in which, when a host sends a write instruction to a primary storage system, the primary storage system transfers the write data to the secondary storage system, and then returns to the host a report indicating completion of the write instruction from the host. Hereafter, remote copying using a synchronous method is called "synchronous remote copying".

On the other hand, an asynchronous method is a method in which, when a host sends a write instruction to a primary storage system, the primary storage system returns to the host a report indicating completion of the write instruction, and then transfers the write data to the secondary storage system. Hereafter, remote copying using an asynchronous method is called "asynchronous remote copying".

Consider an operating mode in which volume pairs comprising primary volumes used by an open-system host (hereafter "open host") and volume pairs comprising primary volumes used by a mainframe-system host (hereafter "mainframe host") are intermixed. In the following explanation, the Nth volume pair is assumed to comprise the Nth primary volume (copy source volume) and the Nth secondary volume (copy target volume) (where N is an integer equal to or greater than one).

In this operating mode, when a fault occurs in a first volume pair in a copy group, even when data is written to the first primary volume the data is not transferred to the first secondary volume. However, if synchronous remote copying is performed using a secondary volume pair belonging to the copy group, the data for the second primary volume is transferred to the second secondary volume. Consequently there is no longer integrity between the primary volume collection and the secondary volume collection. In order to prevent such an occurrence, when a fault occurs in a first volume pair in a copy group, remote copying for all volume pairs belonging to the copy group must be halted.

In one conceivable method of realizing this, under the guidance of each host, remote copying is halted for all volume pairs belonging to the copy group. Specifically, a computer program to control volume pairs (hereafter a "pair control program") is installed on each host using primary volumes in the copy group. The primary storage system notifies each host of a fault. The pair control program on each host transmits to the primary storage system an IO control command to set an IO holding state (a state in which writing to a primary volume is not performed) and a pair state control command to set volume pairs having a primary volume used by itself to a suspend state (a state in which data of a primary volume is not copied to the secondary volume). The primary storage system sets the host to the IO holding state according to the IO control command from the host. And, the primary storage system changes the status of a volume pair specified by the pair state control command to the suspend state, to halt remote copying by the volume pair.

However, this method cannot necessarily be described as suitable. This is because in an open system there are various OSes (operating systems), and a pair control program operates in the environment provided by the OS, so that even when notification of a fault is provided, the expected processing may not necessarily be executed.

Hence an object of this invention is, when volume pairs comprising primary volumes used by open-system hosts and primary volumes used by mainframe-system hosts are intermixed in one copy group, to realize halting of remote copying for all volumes belonging to the copy group, and the halting of writing to each of the primary volumes, without requiring guidance by at least the open-system hosts.

Further objects of the invention will become clear from the following descriptions.

A primary storage system of the invention is connected to a mainframe host, which is a mainframe-system host which transmits write commands, an open host, which is an open-system host which transmits write commands, and one or more secondary storage systems comprising a plurality of secondary volumes, and receives write commands from the mainframe host and from the open host. This primary storage system comprises a plurality of logical volumes, comprising a plurality of primary volumes which respectively form a plurality of volume pairs with the plurality of secondary volumes; a first IO processing portion, which executes IO processing to write data according to a write command received from the mainframe host, to a logical volume among the plurality of logical volumes according to the write command; a second IO processing portion, which executes IO processing to write data according to a write command received from the open host, to a logical volume among the plurality of logical volumes according to the write command; a remote copy portion, which executes remote copying to copy to the secondary volume which forms the volume pair with the primary volume which is the write data write target; and a pair state monitoring portion, which monitors the pair states of each of the plurality of volume pairs and executes control according to the monitoring result.

Within one copy group, comprising two or more volume pairs among a plurality of volume pairs, are intermixed both mainframe pairs which are volume pairs in which a logical volume is the primary volume according to a write command from the mainframe host, and open pairs which are volume pairs in which a logical volume is the primary volume according to a write command from the open system.

When the pair state of a certain volume pair among the one copy group is a fault state, which has been changed due to the occurrence of a fault in the volume pair, the pair state monitoring portion sets the copy group to a write holding state, and then sets the pair states of all other volume pairs belonging to the copy group to a copy halt state. In execution of processing to set the write holding state and to set the copy halt setting state, commands from the open host are not necessary.

If the logical volume according to the received write command is a primary volume belonging to a copy group in the write holding state, then neither the first IO processing portion nor the second IO processing portion performs IO processing to write the write data to the primary volume.

The remote copy portion does not perform remote copying for a copy pair in the copy halt state.

In one aspect, when the pair states of all other volume pairs belonging to the copy group are set to the copy halt state, the pair state monitoring portion changes the write holding state to a write hold release state. If a logical volume according to a received write command is a primary volume belonging to a copy group in this write hold release state, then both the first IO processing portion and the second IO processing portion execute IO processing to write any write data to the primary volume.

The above-described portions can be described in other words as means. Each of the portions can be realized either in hardware (for example, circuits), as a computer program, or as a combination thereof (for example, with a portion realized as a computer program and the remainder realized as hardware). Each computer program can be read from a storage resource (for example, memory) comprised by the computer machine. The storage resource can be installed via a CD-ROM, DVD (Digital Versatile Disc) or other recording media, or can be downloaded from the Internet, and LAN, or another communication network.

BRIEF DESCRIPTION OF THE DRAWINGS

FIG. 5 shows an example of the configuration of a remote copy pair control table;

FIG. 6 shows an example of the configuration of a synchronous remote copy group control table;

FIG. 7 shows an example of the configuration of a synchronous remote copy extension control table;

DESCRIPTION OF THE PREFERRED EMBODIMENTS

Below, a number of embodiments of the invention are explained. In the following explanations, a host which may be either an open host or a mainframe host will simply be called a "host".

Embodiment 1

Figure 1:
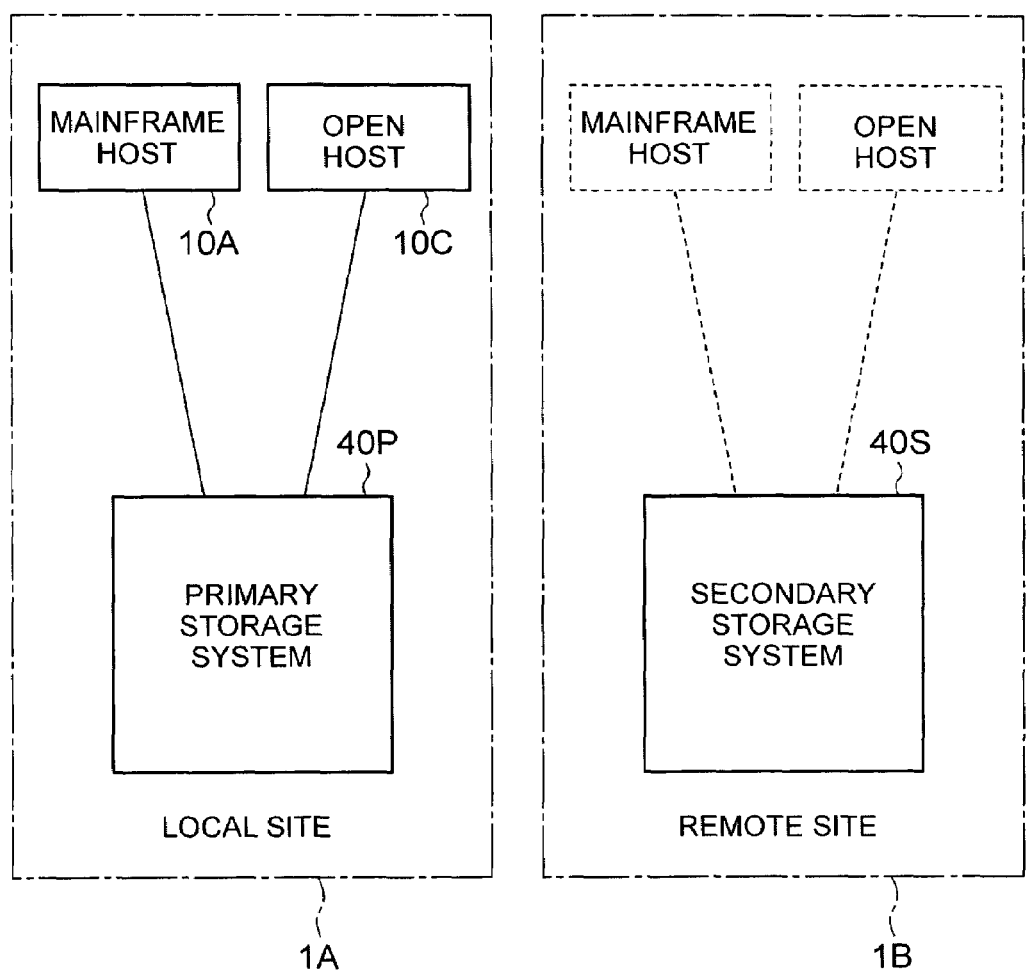
FIG. 1 shows an example of the overall configuration of the system of Embodiment 1 of the invention.

FIG. 1 shows an example of the overall system configuration of Embodiment 1 of the invention.

There are a local site 1A, and a remote site 1B.

At the local site 1A are a primary storage system 40P, and a mainframe host 10A and open host 10C connected to the primary storage system 40P. The primary storage system 40P and mainframe host 10A can communicate via for example ESCON (Enterprise Systems Connection) (a registered trademark) or FICON (Fibre Connection) (a registered trademark) as mainframe system communication. The primary storage 40P and open host 10C can communicate via for example iSCSI (Internet Small Computer System Interface) or Fibre Channel as open system communication.

At the remote site 1B is a secondary storage system 40S connected to the primary storage system 40P. No hosts need be connected to the secondary storage system 40S.

Figure 2:
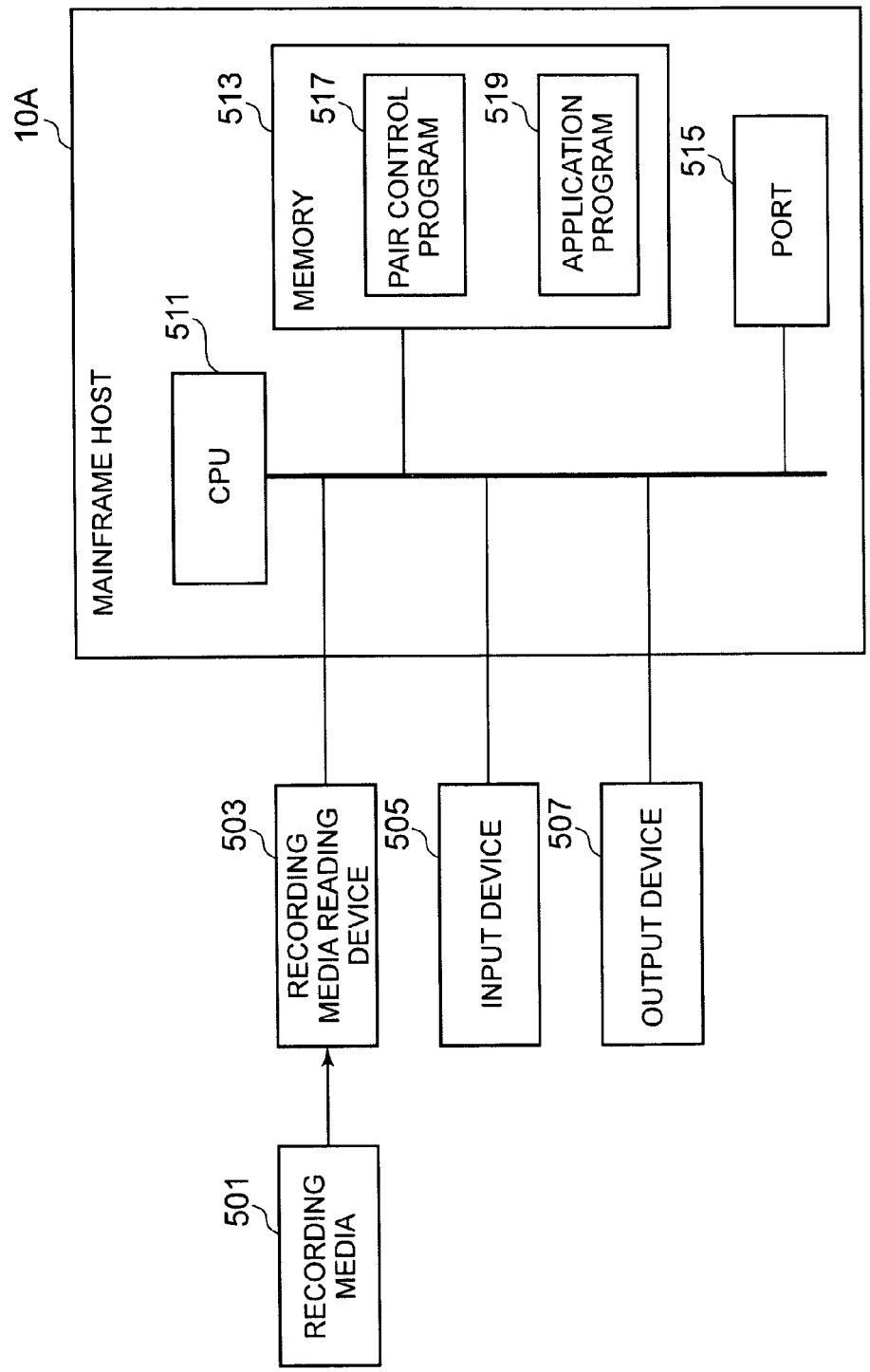
FIG. 2 shows an example of the configuration of a mainframe host 10A.

FIG. 2 shows an example of the configuration of a mainframe host 10A.

The mainframe host 10A is one kind of computer, comprising a CPU 511, memory 513 (which may be various types of storage resource), a port 515 (a port for communication with the primary storage system 40P), an input device 505 (for example a keyboard and mouse), an output device 507 (for example a display device), and a recorded media reading device 503 which reads data from recorded media 501 (for example flexible disks). In the memory 513 are stored for example, as computer programs, a pair control program 517 to control the primary storage system 40P, an application program 519 to execute prescribed tasks, and an OS, not shown (the pair control program 517 may be incorporated into the OS). These computer programs are executed by the CPU 511. Below, when a computer program is the subject of a sentence, processing is in fact performed by the CPU which executes the computer program.

This FIG. 2 shows a representative configuration of a mainframe host 10A; an open host 10C can also have effectively the same configuration. In this case, a pair control program need not be provided in memory.

Figure 3:
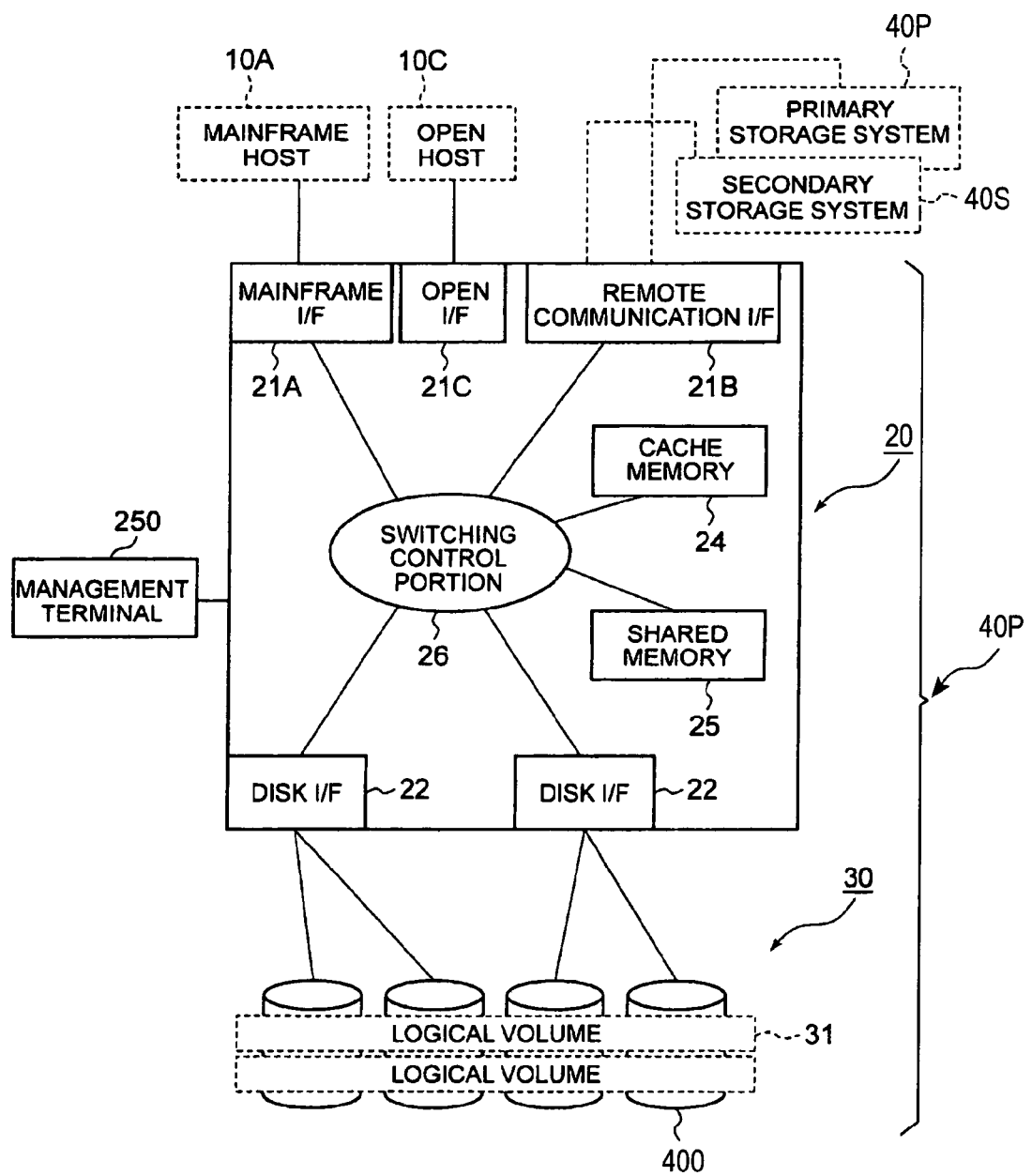
FIG. 3 shows an example of the configuration of a primary storage system 40P.

FIG. 3 shows an example of the configuration of the primary storage system 40P.

The primary storage system 40P can for example be a RAID (Redundant Array of Independent (or Inexpensive) Disks) system, comprising numerous disks 400 arranged in an array.

The primary storage system 40P can be broadly divided into the controller portion 20, and the disk unit 30.

The controller portion 20 comprises, for example, a plurality of interface control devices (hereafter "I/F"), cache memory 24, shared memory 25, and a switching control portion 26. The plurality of interface control devices may include a mainframe host I/F (hereafter "mainframe I/F") 21A, an open system host I/F (hereafter "open I/F") 21C, an I/F with other storage systems (hereafter "remote communication I/F") 21B, and an I/F with disks 400 (hereafter "disk I/F") 22. The controller portion 20 may be connected to a management terminal 250 to manage the primary storage system 20.

Figure 4:
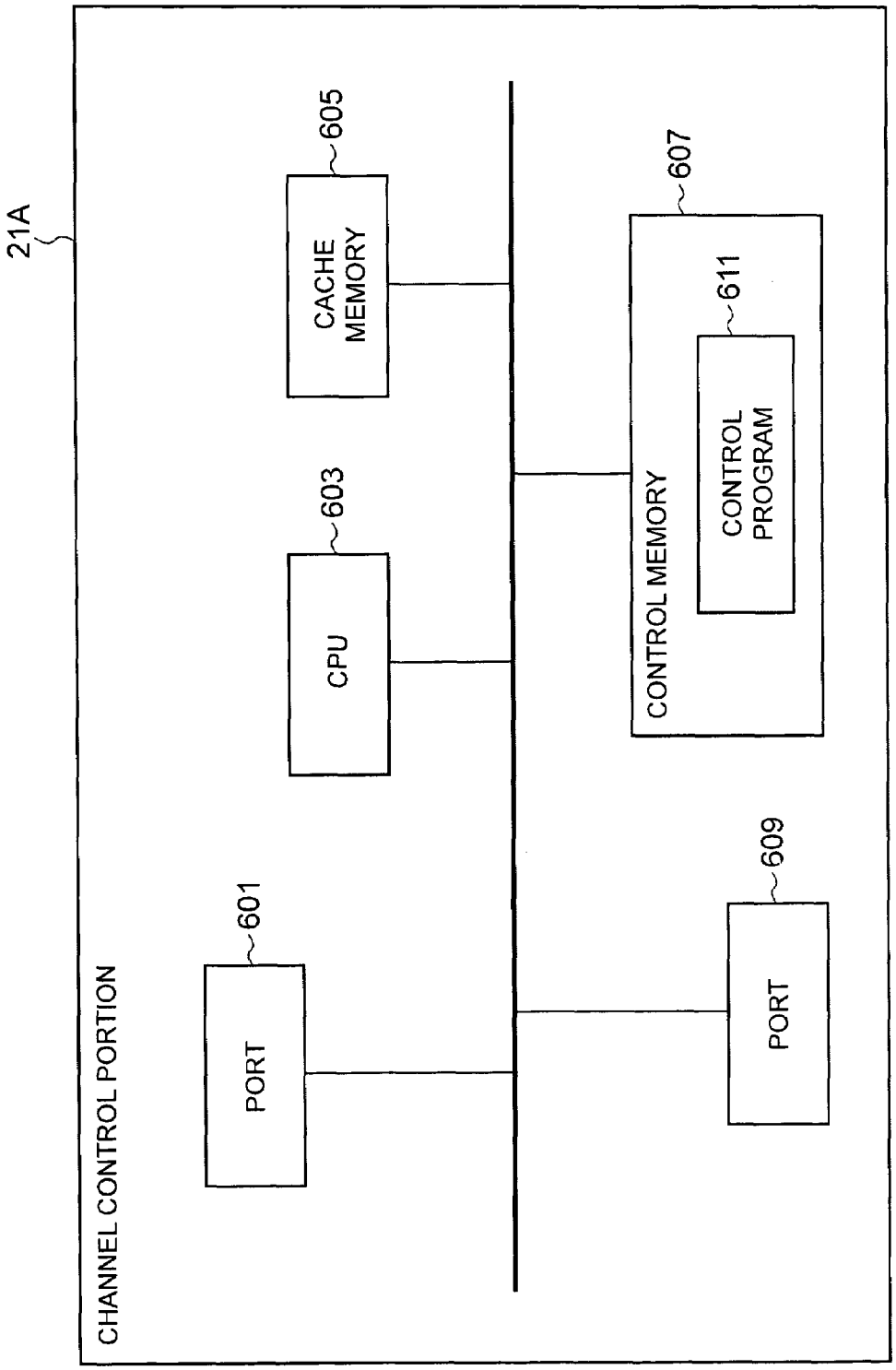
FIG. 4 shows an example of the configuration of a mainframe I/F 21A.

Each I/F is a device which controls communication with the other device, and can be configured in what is effectively similar hardware. FIG. 4 shows an example of the configuration of a mainframe I/F 21A. The mainframe I/F 21A comprises a port 601 for communication with the mainframe host 10A, a port 609 connected to the switching control portion 26, cache memory 605 to temporarily store data for transmission or data received, control memory 607 storing a control program 611, and a CPU 603 which executes the control program 611.

The control program 611 is stored in the mainframe I/F 21A, open I/F 21C, and remote communication I/F 21B. In this Embodiment 1, the control program 611 stored in the mainframe I/F 21A and in the open I/F 21C is an IO processing program which processes IO commands (write commands and read commands) from a host. On the other hand, the control program 611 stored in the remote communication I/F 21B is a remote copy program which executes remote copying, and a pair state monitoring program which monitors the pair states of volume pairs and executes processing based on the monitoring results.

The cache memory 24 is for example volatile or nonvolatile memory, which can temporarily store data received from the hosts 10A and 10C and data read from the disks 400. The shared memory 25 is for example volatile or nonvolatile memory, in which is stored information related to control in the primary storage system 40P (hereafter the "control data collection"). For example, the shared memory 25 and cache memory 24 need not be separate devices, and a shared memory region and cache memory region may be provided in the same memory device.

The switching control portion 26 is a device which interconnects each of the I/Fs 21A, 21B and 22, cache memory 24, and shared memory 25, and can for example be configured as an ultra-high speed crossbar switch or other high-speed bus which transmits data through high-speed switching action.

The disk unit 30 comprises a plurality of disks 400, arranged in an array. As internal disks 400, for example, hard disks, flexible disks, optical disks, and other disk-type storage devices can be used. In place of disks 400, other kinds of storage devices, such as magnetic tape or semiconductor memory (for example flash memory), can also be used. Logical volumes 31 are provided in the storage region of the disks 400. A plurality of logical volumes may be configured as a single logical storage unit. Primary volumes used by a mainframe host and primary volumes used by an open host may be intermixed in such a storage unit.

A secondary storage system 40S is connected to the above-described remote communication I/F 21B, and in addition, another primary storage system may also be connected. Or, a remote communication I/F connected to a secondary storage system 40S, and a remote communication I/F connected to another primary storage system, may be provided separately in the control portion 20. Also, the secondary storage system 40S may be connected to the remote communication I/F 21B, and another primary storage system may be connected by a dedicated line via a prescribed I/F, not shown.

The secondary storage system 40S may be configured similarly to the primary storage system 40P. Or, the control portion 20 of at least one among the primary storage system 40P and the secondary storage system 40S may be a circuit board of simpler configuration than that of FIG. 3, comprising for example a CPU, memory, and communication port. In this case, the CPU can execute processing performed by a plurality of I/Fs.

A control data collection stored in the above-described shared memory 25 may for example be a remote copy pair control table, synchronous remote copy group control table, and synchronous remote copy extension control table, explained below.

FIG. 5 shows an example of the configuration of a remote copy pair control table.

The remote copy pair control table is a table in which information relating to each volume in the primary storage system is registered, and which is used for control of remote copying. Specifically, for example, for each primary volume there are a primary volume # (where # is an identifier); copy target device # (primary storage system identifier); copy target volume # (secondary volume identifier); copy type (whether remote copying by a synchronous or asynchronous method); group # (copy group identifier); pair state, and MF/OPEN (whether mainframe or open).

In a pair state, "Simplex" means a volume which does not form a volume pair, and "Duplex" means a primary volume which forms a volume pair. Upon receiving a write command which specifies a volume in the "Duplex" pair state and with the "synchronous" copying type, the IO processing program can upon this occasion start the remote copying program. The IO processing program writes data to cache memory 24 according to this write command, and the remote copying program which has been started transfers the data in cache memory 24 to the secondary volume corresponding to the volume specified by the command. On receiving a prescribed response (for example, a completion report) to this transfer, the remote copying program returns a response to the IO processing program, and the IO processing program, upon receiving this response, returns a completion report to the host which is the origin of transmission of the write command. When the copying type specified by the write command is "asynchronous", the IO processing program, upon receiving the write command and writing the data to cache memory 24, can return a completion report to the host which is the write command transmission origin. In this case, the remote copying program is executed with timing different from the reception of the write command.

Although not shown, there are also "Fault Suspend" and "Suspend" pair states; both indicate that remote copying is temporarily halted. The remote copying program is not executed even when a write command is issued for a volume the pair state of which is "Fault Suspend" or "Suspend".

In the table of FIG. 5, the copy group identifier of an arbitrary volume (a volume the pair state of which is "Fault Suspend"), and whether the host using the volume is a mainframe host or an open host, can be identified from the group # and MF/OPEN values.

FIG. 6 shows an example of the configuration of a synchronous remote copy group control table.

In this table, information relating to copy groups for which synchronous remote copying is executed (hereafter "synchronous copy groups") is registered. Specifically, for each synchronous copy group, the group #, control information, IO holding initiation time, and timeout time are registered. The control information is represented by two values, which are for example ON(1) and OFF(0). Control information ON means the state is the IO holding state; control information OFF means the state is not the IO holding state. The IO holding initiation time represents the time at which the IO holding state is initiated; when starting from this time the timeout time (for example, 120 seconds) has elapsed, the control information is forcibly changed from ON to OFF. The IO holding state does not forbid reception of write commands, but signifies a state in which IO processing according to write commands is not executed. Specifically, when for example a write command is received while in the IO holding state, by returning a special response (for example busy, or a retry request), the host issuing the write command can be notified that the write command will be accepted at a later time. More specifically still, for example the IO holding state, is equivalent to SCP (State Change Pending) for a mainframe host, and to a busy (queue full) state for an open host.

FIG. 7 shows an example of the configuration of a synchronous remote copy extension control table.

In this table, information relating to extended groups of synchronous copy groups is registered. An extended group is one of the above-described copy groups, in a case in which a portion of a primary volume collection belonging to one copy group exists in a first primary storage system, and another portion exists in a second primary storage system. In this table are registered, for example, a flag indicating whether an extension group is valid or not, an extension group # and the number of other primary storage systems comprising primary volumes in an extension group. In addition, the device # (other primary storage system #), and the command device volume # (identifier of the volume in which the command device is stored) are registered.

Below, an example of the flow of processing in Embodiment 1 is explained.

(Case 1) Case in which all of the primary volumes belonging to a copy group are in one primary storage system.

That is, this Case 1 is a case in which the copy group is not an extended group. In this Case 1, all the primary volumes belonging to the copy group are in one primary storage system 40P, but not all the secondary volumes need exist in a single secondary storage system, but may exist in a plurality of secondary storage systems. FIG. 8 shows a summary of the flow of processing in Case 1.

Figure 8A:
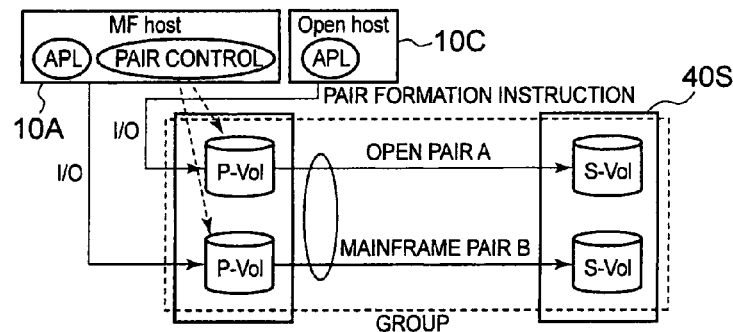
FIGS. 8A-8D show a summary of the flow of processing for a case (case 1) in which all the primary volumes belonging to a copy group are in one primary storage system.

First, as shown in FIG. 8A, the pair control program in the mainframe host 10A issues to the mainframe I/F 21A a pair formation direction (a command to define a copy group and to form volume pairs of the copy group). In response to this pair formation direction, the mainframe I/F 21A defines within the primary storage system 40P a synchronous copy group comprising at least one open pair (pair comprising a primary volume used by an open host) and at least one mainframe pair (pair comprising a primary volume used by a mainframe host). As information representing this copy group, for example, the volume #, copy target device #, copy target volume #, copy type, group #, pair state, and MF/OPEN, are registered in the remote copy pair control table (see FIG. 5). Because this pair state is "synchronous", the group # is registered in the synchronous remote copy group control table as well.

Figure 8B:
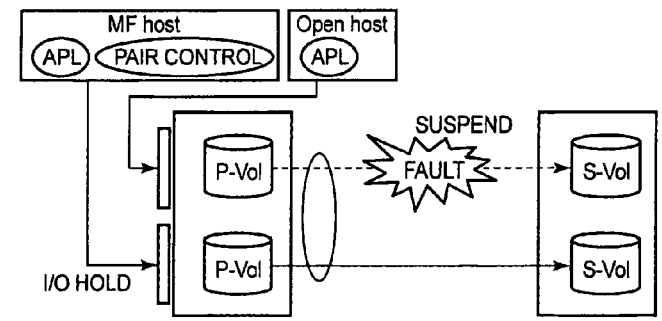

Next, as shown in FIG. 8B, suppose that a fault occurs in a certain volume pair (for example, an open pair) within this copy group. The fault occurs, for example, due to the occurrence of a fault in the synchronous remote copy transfer path of the volume pair (for example, the remote communication I/F is disconnected). At the remote communication I/F, the module which has detected the fault (and which may be either a computer program or a hardware circuit) identifies each of the volume pairs for which synchronous remote copying is performed using this transfer path, and changes the pair states of all the identified volume pairs (the pair states in the table of FIG. 5) to "Fault Suspend". Identification of each of the volume pairs can for example be performed by registering in advance, for each volume, an identifier (for example, a path name represented by a port #, volume # or similar) for the transfer path to be used.

The pair state monitoring program of the remove communication I/F monitors the pair state for each volume. When even one pair state in the "Fault Suspend" state is detected, the pair state monitoring program sets all hosts using the copy group corresponding to the pair state to the IO holding state. Thereafter, at least until the IO holding state is released, new data is not written to any primary volume belonging to the copy group.

Figure 8C:
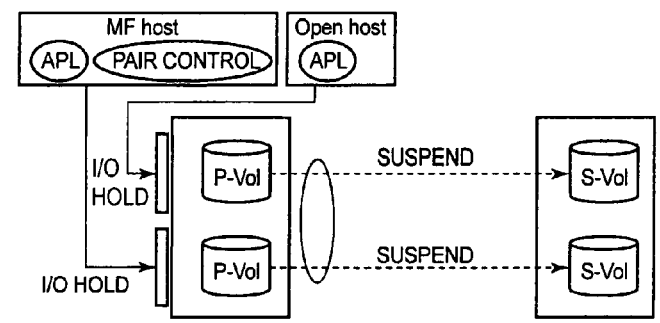

Thereafter, as shown in FIG. 8C, the pair state monitoring program changes the state of all volume pairs belonging to the copy group to "Suspend". By this means, no matter to which primary volume of any of the volume pairs data is written, copying to the secondary volume is not performed.

Figure 8D:
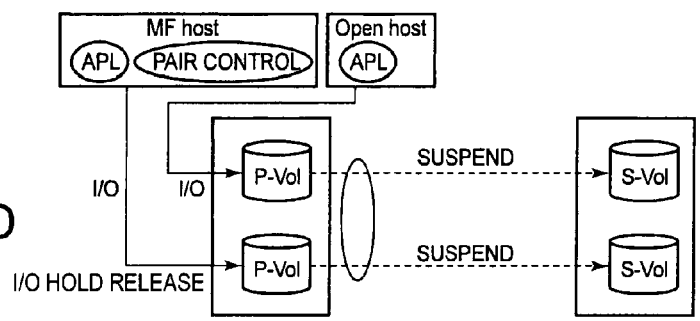

Hence after the end of this processing, the IO holding state may be released, as shown in FIG. 8D. When the IO holding state is released, new data is written to the primary volumes of volume pairs in the "Suspend" state. In this case, differences occur between the two volumes of volume pairs, but when in the "Suspend" pair state, the differential data is managed (for example, the data (differential data) written to a primary volume, and to which location it is written, are managed). Thereafter, resynchronization is performed, and the differential which had been managed is incorporated into the secondary volumes, so that the difference between primary volumes and secondary volumes can be eliminated.

Figure 9:
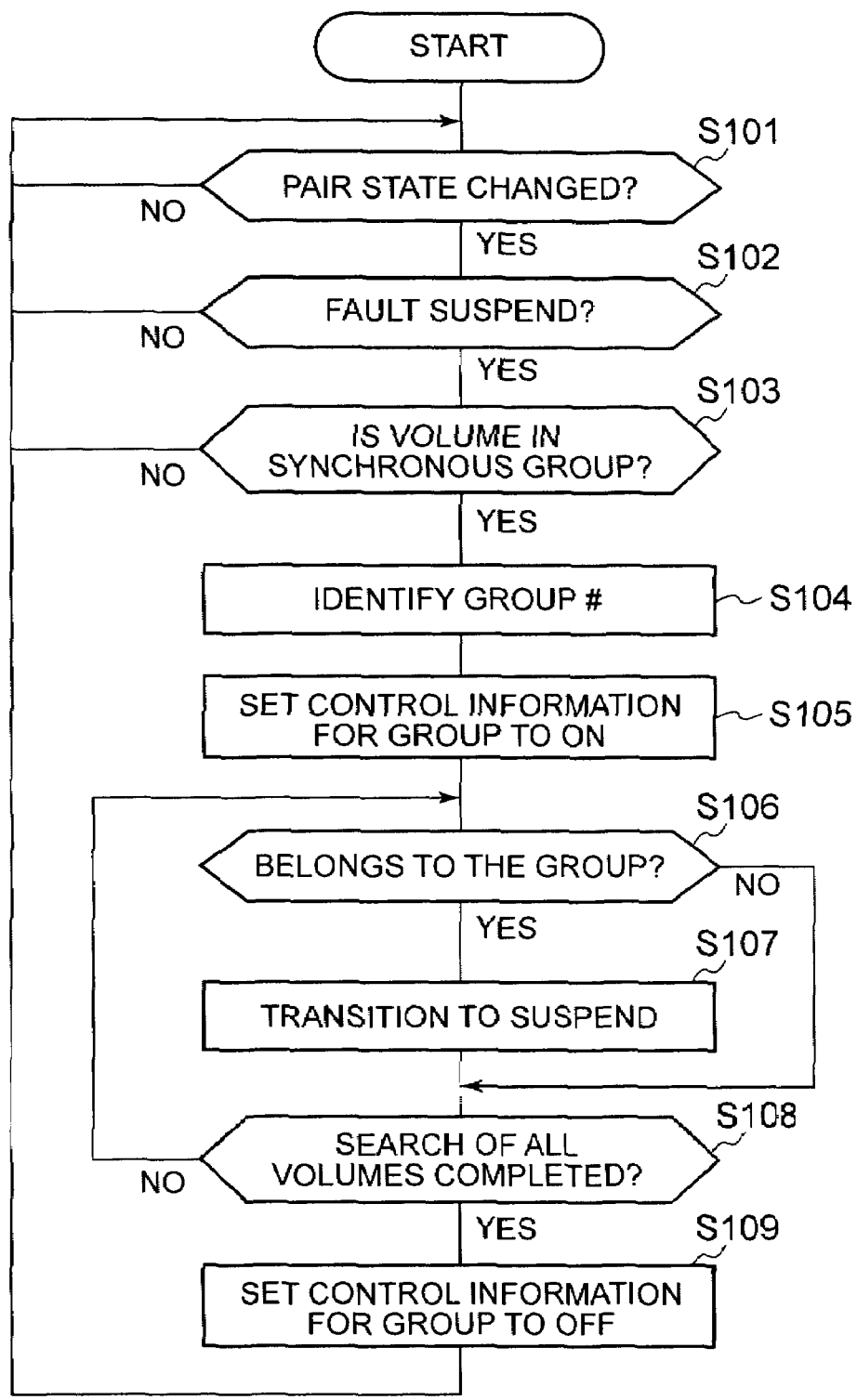
FIG. 9 shows the flow of processing of the pair state monitoring program in case 1.

FIG. 9 shows the flow of processing of the pair state monitoring program in Case 1.

When the result of pair state monitoring indicates that a pair state has changed (YES in S101), and moreover the pair state after the change is "Fault Suspend" (YES in S102), the pair state monitoring program judges whether the copy group to which the volume pair with this pair state belongs is a synchronous copy group or not, and specifically, whether the identifier of the copy group is registered in the synchronous remote copy group control table (see FIG. 6) (S103). In Embodiment 1, when the copy type of at least one volume pair is "synchronous", the identifier of the copy group having this volume pair is registered in the table of FIG. 6, whereas when the copy type of all volumes is "asynchronous", the copy group identifier is not registered in the table of FIG. 6.

When the pair state monitoring program judges the group to be a synchronous copy group in S103 (YES in S103), the copy group identifier is identified (S104), and the control information corresponding to the identified group # is set to ON (S105). That is, the IO holding state is initiated. At this time, the IO holding initiation time is registered in the table of FIG. 6. Also, when for example the group # is identified prior to S104, S104 is not necessary.

Next, the pair state monitoring program identifies all the volume pairs belonging to the identified group #, and changes the pair state of all the identified volume pairs to "Suspend" (S106, S107, S108).

Thereafter, the pair state monitoring program changes the control information corresponding to the group # from ON to OFF (S109). The pair state monitoring program can adopt, as the timing for changing the control information from ON to OFF, the timing at which the corresponding timeout time has elapsed from the registered IO holding initiation time. Hence when for example S109 is executed for some reason even when the result of S108 is YES, the IO holding state continues indefinitely; but by means of this measure, indefinite continuation of the IO holding state can be prevented.

Figure 10:
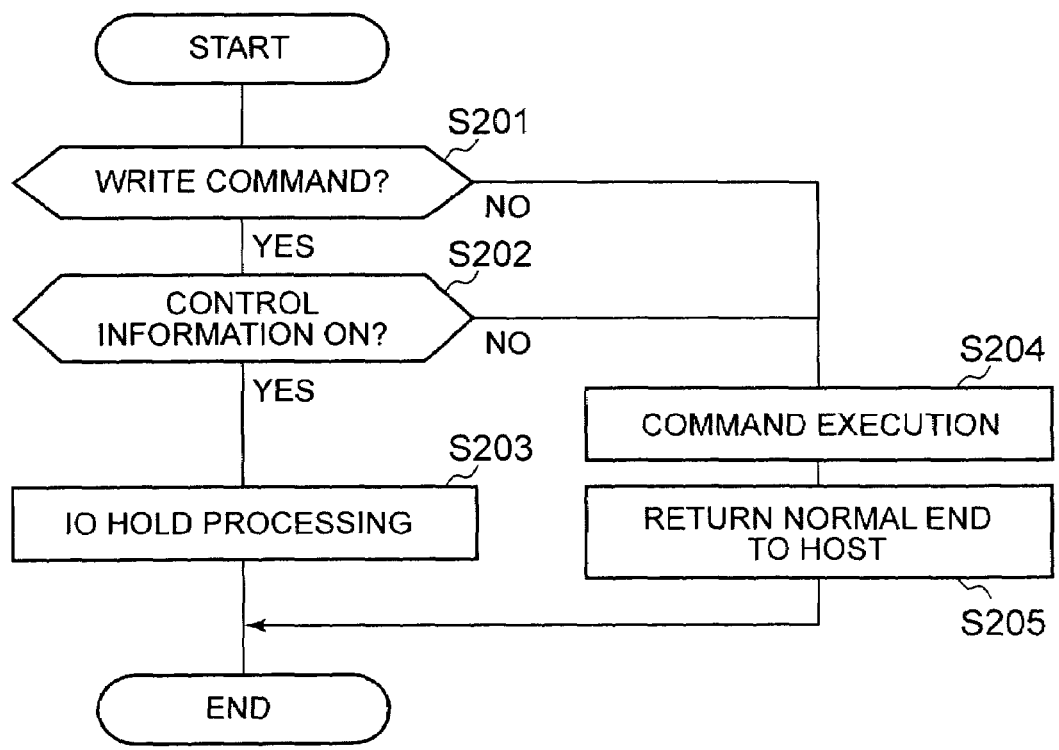
FIG. 10 shows the flow of processing of the IO processing program in case 1.

FIG. 10 shows the flow of processing of the IO processing program in Case 1. This processing flow is also executed by the mainframe I/F IO processing program and by the open I/F IO processing program.

When a read command is received (NO in S201), the IO processing program executes the read command (that is, reads data from a volume and transmits the data to the host) (S204), and returns a normal-end message to the host (S205).

When on the other hand a write command is received (YES in S201), the IO processing program identifies the copy group to which the volume specified by the write command belongs, and if the control information for the copy group is ON (YES in S202), IO hold processing is executed (for example, a busy state is returned to the host) (S203). If the control information for the copy group is OFF (NO in S202), the IO processing program performs data writing according to the received write command (S204), and returns a normal-end (writing completed) message to the host (S205).

By means of this processing flow, if the control information is ON, writing of new data to any primary volume of the copy group corresponding to the control information can be avoided.

(Case 2) Case in which the primary volumes belonging to a copy group are in a plurality of primary storage systems.

That is, Case 2 is a case in which the copy group is an extended group. In Case 2, a copy group is defined comprising primary volumes existing in a plurality of primary storage systems, so that the tables shown in FIG. 5, FIG. 6 and FIG. 7 are stored in a storage area (for example, shared memory) for all of the primary storage systems. The plurality of secondary volumes belonging to the copy group may exist in a single secondary storage system, or may be distributed among a plurality of secondary storage systems.

FIG. 11 shows a summary of the flow of processing performed in Case 2. In FIG. 11, although not indicated in particular, a copy group (extended group) is defined by a method similar to that of FIG. 8A.

Figure 11A:
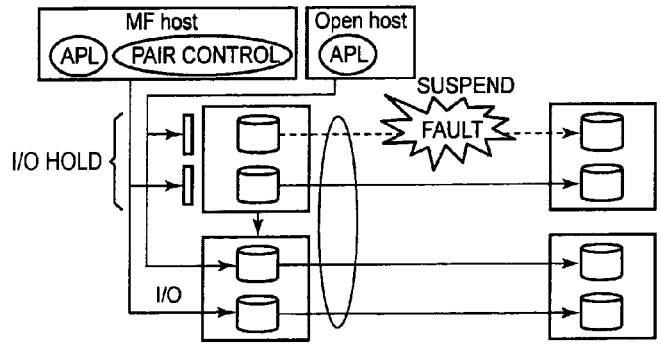
FIGS. 11A-11D show a summary of the flow of processing for a case (case 2) in which primary volumes belonging to a copy group are in a plurality of primary storage systems.

As shown in FIG. 11A, when a fault occurs in a first volume pair, similarly to Case 1, the pair states of the first primary volumes in the first primary storage system having the first primary volume of the first volume pair are registered as "Fault Suspend". In this case, a first pair state monitoring program of the first primary storage system initiates the IO holding state for the copy group to which the first primary volume belongs, and notifies second primary storage systems having second primary volumes belonging to the extended group of the first primary volume of the extended group identifier.

Figure 11B:
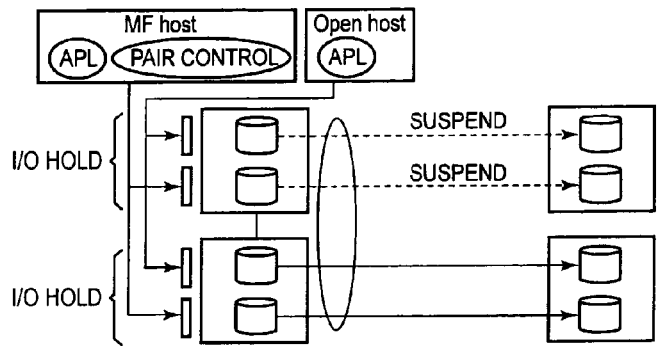

Next, as shown in FIG. 11B, in the first primary storage system, the first pair state monitoring program sets the volume pairs of all primary volumes belonging to the extended group (but only primary volumes within the first primary storage system) to "Suspend". In the second primary storage system, the second pair state monitoring program executed by the system sets the notified group # to the IO holding state (control information set to ON).

Figure 11C:
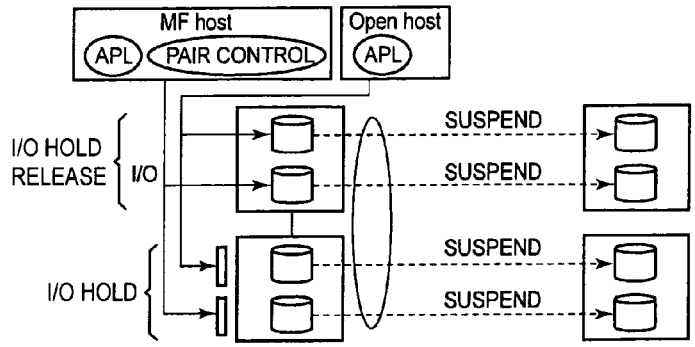

Next, as shown in FIG. 11C, in the first primary storage system, the IO holding state for the extended group is released by the first pair state monitoring program. In the second primary storage system, volume pairs for all primary volumes in the extended group which is in the IO holding state (however, only primary volumes within the first primary storage system) are set to "Suspend" by the second pair state monitoring program.

Figure 11D:
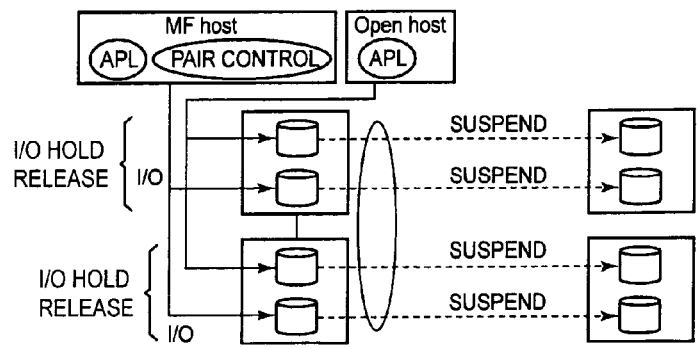

Finally, as shown in FIG. 11D, in the second primary storage system the IO holding state of the extended group is released by the second pair state monitoring program.

The explanation of FIG. 11 employs the example of a case in which there are two primary storage systems related to one copy group; in a case in which three or more primary storage systems are connected in a so-called cascade connection, setting of the IO holding state, changing of the pair state to "Suspend" for all primary volumes belonging to the extended group, and release of the IO holding state, are performed in succession from the primary storage system which has detected the pair volume fault.

Figure 12:
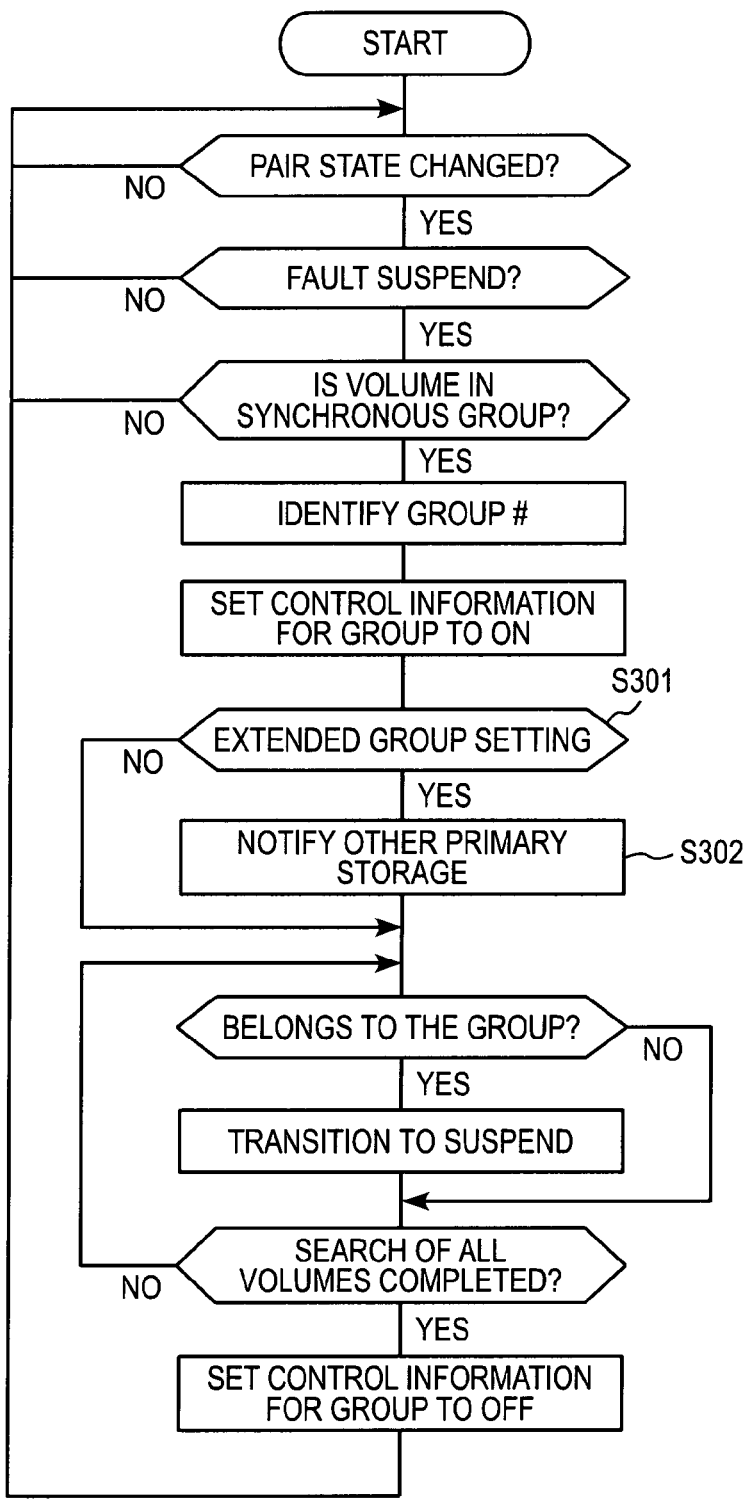
FIG. 12 shows the flow of processing of the pair state monitoring program in case 2.

FIG. 12 shows the flow of processing of the pair state monitoring program in Case 2.

According to this processing flow, S301 and S302 are performed between S105 and S106 in FIG. 9.

In S301, the first pair state monitoring program judges whether the identified group # has been set to an extended group. Here, when the group # is registered in the synchronous remote copy extended group control table (see FIG. 7), and moreover the valid/invalid flag is turned on, the group is judged to be set to an extended group.

When it is judged that the group is set to an extended group (YES in S301), in S302 the first pair state monitoring program notifies the second primary storage system of the group # identified in this processing flow and the "Fault Suspend" state. The second primary storage system which is notified is the storage system having the device # (see FIG. 7) corresponding to the group #. In S302, the first pair state monitoring program can write a state change command (a command to change the pair state), comprising the group # and the "Fault Suspend" state, to the command device volume # corresponding to the device #.

Here, a command device volume is a volume to which commands are written to control the storage system comprising the volume, and is of a different type from volumes to which data from the host is written. In the second primary storage system, when a state change command is read from a command device volume, the second pair state monitoring program can initiate the processing flow of FIG. 13. Specifically, for example, the second state monitoring program judges that a pair state has changed due to the state change command, and because "Fault Suspend" is comprised by the state change command, the state is judged to be "Fault Suspend". Further, the group # comprised by the state change command is written to the synchronous remote copy control table within the second primary storage system, and so by setting the control information to ON the IO holding state is initiated, and the pair states of all the primary volumes corresponding to the group # (primary volumes in the second primary storage system) are all changed to "Suspend". Thereafter, the second pair state monitoring program changes the control information to OFF.

As a method of causing the second primary storage system to execute a pair state change, in addition to the method of writing the state change command to a command device volume as described above, other methods can be adopted. For example, a method is conceivable in which the first pair state monitoring program uses the group # and "Fault Suspend" state to call the second pair state monitoring program.

According to the above-described Embodiment 1, when the IO processing program executed by various host I/Fs receives a write command, a decision is made to execute or not to execute the write command according to whether the control information for the copy group to which the volume specified by the write command belongs is OFF or is ON. The pair state monitoring program monitors the pair state of each volume pair, and when a "Fault Suspend" state is detected, sets the control information for the copy group to which the volume pair of the "Fault Suspend" state belongs to ON. By this means, a state is caused in which no writing occurs to any of the primary volumes belonging to the copy group, and in this state the pair state monitoring program changes the pair state for all the primary volumes to "Suspend", and after the end of this processing, returns the control information, which had been ON, to OFF. By this means, in both Case 1 and in Case 2, integrity between primary volume collections and secondary volume collections can be guaranteed in copy groups in which mainframe pairs and open pairs are intermixed. To this end, the IO holding state settings and pair states are changed to "Suspend" all at once; however, this can be executed without guidance not only by an open host, but by a mainframe host as well. That is, there is no need to provide either an open host or a mainframe host with a function to issue commands to make IO holding state settings, or with a function to issue commands to change pair states all at once to "Suspend", or with other special functions.

Embodiment 2

Embodiment 2 of the invention is explained. Below, differences with Embodiment 1 are mainly explained, and explanations of points in common with Embodiment 2 are omitted or simplified.

In this Embodiment 2, a Case 3 is executed in place of or in addition to Case 2. Case 3 is a case in which a plurality of primary storage systems relating to one copy group are not connected so as to enable mutual communication. Specific cases such as this include, for example, cases in which no advance connections are made using dedicated lines or similar, or cases in which connections between primary storage systems are disconnected. When disconnections are detected, the first pair state monitoring program can choose to execute the processing flow of Case 3 in place of Case 2.

FIG. 13 and FIG. 14 show summaries of the processing flow for Case 3.

Figure 13A:
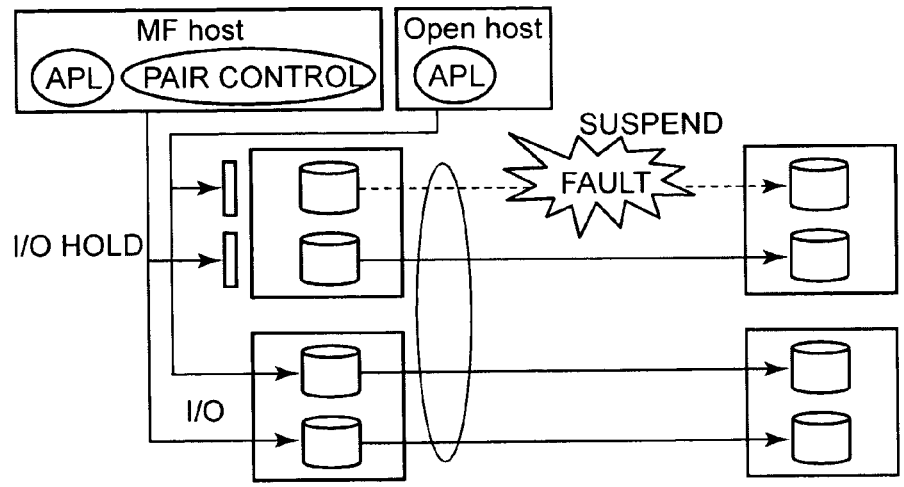
FIGS. 13A-13C show a summary of the flow of processing for a case (case 3) in which a plurality of primary storage systems for one copy group are not connected so as to enable mutual communication.

As shown in FIG. 13A, when a fault occurs in a first volume pair, the "Fault Suspend" pair state is registered for the first primary volume in the first primary storage system having the first primary volume of the first volume pair. In this case, the first pair state monitoring program initiates the IO holding state for the copy group to which the first primary volume belongs. By this means, an IO holding state is set for all primary volumes belonging to the copy group (primary volumes of the first primary storage system).

Figure 13B:
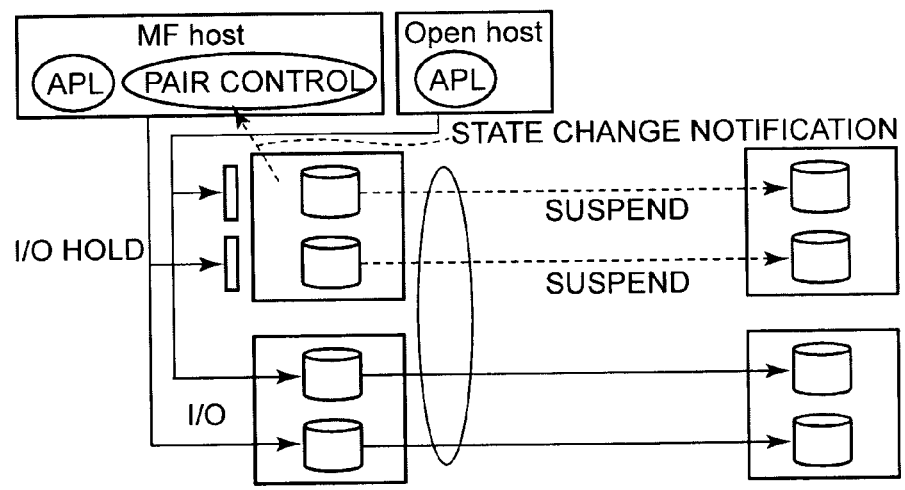

Next, as shown in FIG. 13B, the first pair state monitoring program changes the pair states of all volume pairs belonging to the copy group (volume pairs comprising primary volumes of the first primary storage system) to "Suspend". By this means, regardless of whether the volume pair the state of which is "Fault Suspend" is a mainframe pair or not, mainframe pairs are set to "Suspend". On this occasion, the first pair state monitoring program transmits, to the pair control program of the mainframe host, notification that the state of mainframe pairs has changed to "Suspend". As one conceivable method of executing this processing, for example, in the table of FIG. 5, the mainframe host identifier is registered in advance in entries corresponding to mainframe pairs in the table of FIG. 5, and the entries are used to identify the mainframe host which is to be the transmission destination for the state change notification.

Figure 13C:
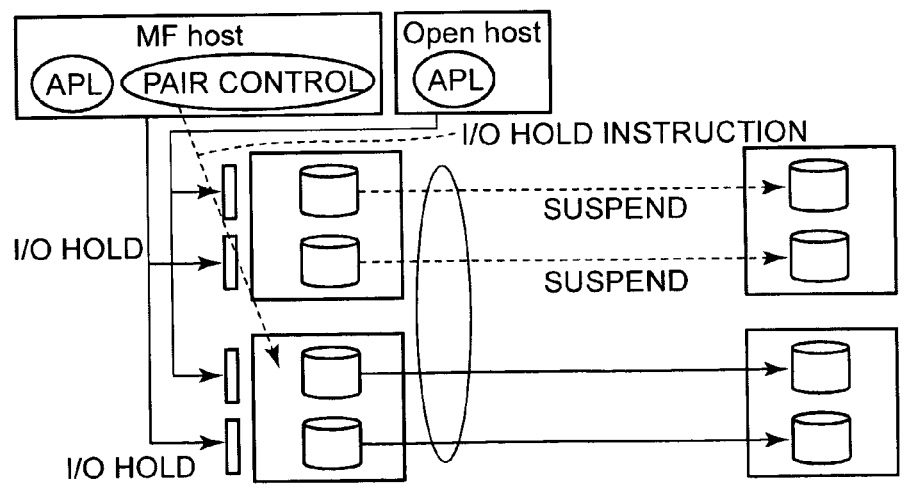

Next, as shown in FIG. 13C, the mainframe host pair control program, in response to the state change notification, identifies the copy group to which the mainframe pairs in the "Suspend" state belong, identifies a second primary storage system having primary volumes belonging to the identified copy group, and issues an IO holding specification command, setting the identified copy group into the IO holding state, for the identified second primary storage system. The mainframe I/F 21A receives the IO holding specification command; but when the mainframe I/F 21A identifies the received command as an IO holding specification command, the command is transferred to the remote communication I/F 21B. By this means, the second pair state monitoring program, responding to the IO holding specification command, sets to ON the control information (that is, sets the IO holding state) corresponding to the group # specified by the command. As the method of identifying the copy group, and the method of identifying the second primary storage system which is the destination for issuing the IO holding specification command, for example, a method in which together with the state change notification the identifier of the copy group to which "Suspend" mainframe pairs belongs and the device # of the second primary storage system are received from the first primary storage system, or a method in which the pair control program stores the tables of FIG. 5, FIG. 6 and FIG. 7 stored in each primary storage system, and each of the tables is referenced, or various other methods are conceivable.

Figure 14A:
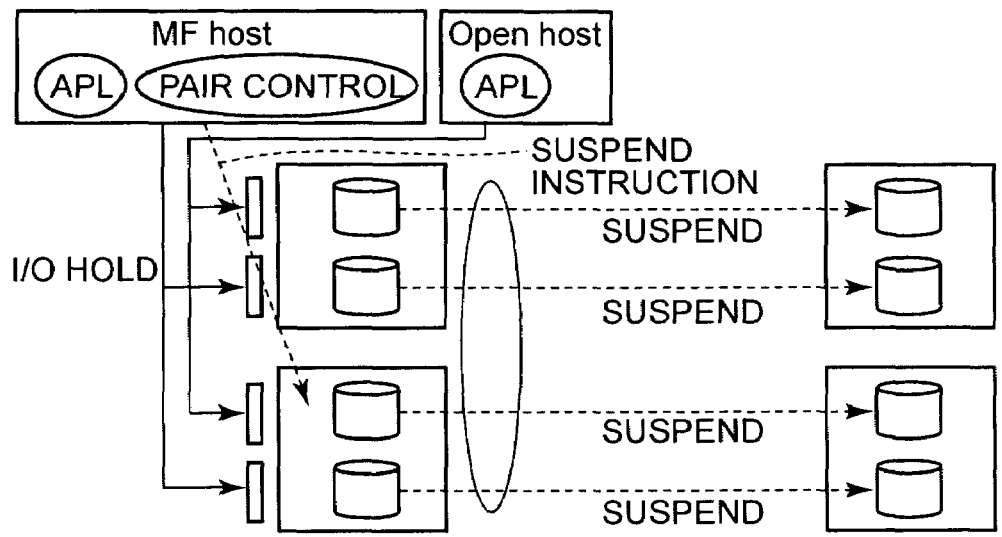
FIGS. 14A-14B show an portion of the remainder of the summary of the flow of processing in case 3.

Next, as shown in FIG. 14A, the pair control program issues a suspend specification command to the identified second primary storage system, to change the pair states of all volume pairs belonging to the identified copy group to "Suspend". In response to this suspend specification command, the second pair state monitoring program changes the pair states of all volumes belonging to the copy group to "Suspend". When this processing ends, the second state change program may return a prescribed response to the pair control program. All the volume pairs belonging to the identified copy group may be identified by the pair control program using the group # of the copy group and may be specified by the suspend specification command, or identification may be performed by the second pair state monitoring program.

Figure 14B:
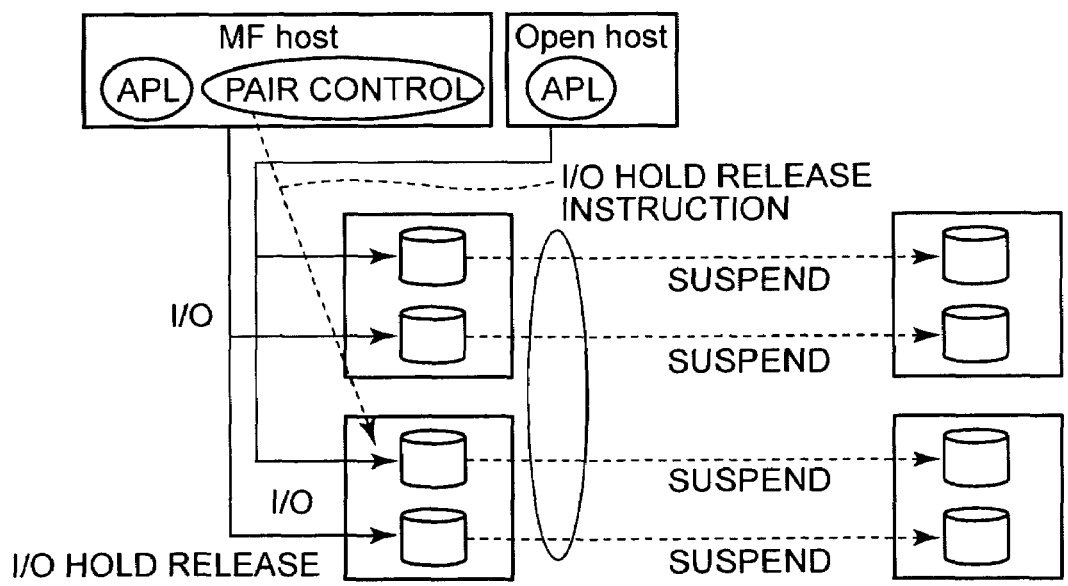

Finally, as shown in FIG. 14B, the pair control program issues an IO holding release specification command to release the IO holding state for the identified copy group, with prescribed timing (for example, when a fixed length of time has elapsed after issuing the suspend specification command, or when a prescribed response is received from the second pair state monitoring program). By this means, the second pair state monitoring program, in response to the IO holding release specification command, sets to OFF the control information (that is, releases the IO holding state) corresponding to the group # specified by the command.

The above is an explanation of Case 3. In this Case 3, issuing of the above-described IO holding specification command, issuing of the suspend specification command, and issuing of the IO holding release specification command need only be performed one time for one second primary storage system. This is because commands are issued in copy group units.

Thus according to Embodiment 2, even when a plurality of primary storage systems related to one copy group are not connected so as to enable mutual communication, setting of IO holding states and changing all at once of pair states to "Suspend" can be executed without guidance of an open host. That is, in the case of a mainframe host there is the need to execute a pair control program having such special functions as those for issuing IO holding specification commands, for issuing suspend specification commands, and for issuing IO holding release specification commands; but in the case of an open host, there is no such need. Various OSes may be installed on an open host, and reliability of open hosts is low compared with mainframe hosts; hence it is advantageous that there is no longer a need to install on such an open host a pair control program with the above-described special functions.

The contents of the above-described Embodiments 1 and 2 are supplemented. The following is common to Embodiments 1 and 2.

Volume formats differ in mainframe systems and in open systems, and command systems for processing also differ. Hence mainframe I/Fs and open I/Fs cannot recognize each others' volumes, and command systems are different.

In general, mainframe systems are often used for core tasks, and are superior to open systems in both reliability and performance. Hence in these embodiments, configurations are employed in which, in open systems, copy pairs can be set and released and other operations in open systems performed from a host in a mainframe system. Specifically, a volume which receives commands to set and release copy pairs from a host in an open system is a mainframe volume (command device volume) which is unrelated to the volumes of copy pairs in an open system. In the mainframe I/F, commands received by the command device volume are interpreted, and if a command is a copy pair setting command, the parameters of the command (for example, the open system volume # of the primary volume, copy target device #, copy target open system volume #, copy type, group #) are set in the remote copy pair control table. In these embodiments, moreover, data stored in the remote copy pair control table is stored in a common format so as to enable use by the mainframe I/Fs and open I/Fs. By this means, open system copy pairs can be formed by a mainframe system host. Moreover, because open system copy pairs can be formed by a mainframe system host, copy pairs of a mainframe system and copy pairs of an open system can be set as a copy group.

As previously explained, each time the pair state of a copy pair changes, a mainframe system can provide notification to a mainframe system host of the state change. When a fault occurs in a copy pair of an open system and operation is suspended, by providing notification of the copy pair state change by simultaneously changing the states of copy pairs in the mainframe system within the group to the suspend state, this can be detected by the mainframe I/F. This is possible because of the common data format of open systems and mainframe systems. By this means, a mainframe I/F can be notified of a fault in an open system copy pair, and the mainframe system host can be notified of the fault.

In the above explanation, it is assumed that processing is performed by the mainframe I/F and by the open I/F; here however execution is by the CPUs in the mainframe I/F and in the open I/F.

In the above, a number of embodiments of the invention have been explained; however, these are examples used to explain the invention, and the scope of the invention is not limited only to these embodiments. The invention can be implemented in a variety of other modes.

What is claimed is:

1. A storage system, which is a primary storage system, connected to a mainframe host, which is a host in a mainframe system and which transmits write commands, an open host, which is a host in an open system and which transmits write commands, and one or more secondary storage systems, comprising a plurality of secondary volumes, and which receives write commands from said mainframe host and from said open host, comprising:

a plurality of logical volumes, comprising a plurality of primary volumes forming a plurality of volume pairs with said plurality of secondary volumes;

a first IO processing portion, which executes IO processing to write data, complying with a write command received from said mainframe host, to a logical volume among said plurality of logical volumes complying with the write command;

a second IO processing portion, which executes IO processing to write data, complying with a write command received from said open host, to a logical volume among said plurality of logical volumes complying with the write command;

a remote copy portion, which executes remote copying to copy to a secondary volume forming a volume pair with the primary volume which is the write data write destination; and a pair state monitoring portion, which monitors the pair states of each of said plurality of volume pairs, and executes control according to the monitoring results, wherein in one copy group formed by two or more volume pairs among said plurality of volume pairs, mainframe pairs, which are volume pairs the primary volume of which is a logical volume which complies with write commands from said mainframe host, and open pairs, which are volume pairs the primary volume of which is a logical volume which complies with write commands from said open host, are intermixed, wherein when the pair state of a certain volume pair in said one copy group is a fault state which has been changed due to the occurrence of a fault in the volume pair, said pair state monitoring portion sets a write holding state for the copy group, and then sets the pair states for all other volume pairs belonging to the copy group to a copy halt state, wherein when a logical volume complying with a received write command is a primary volume belonging to a copy group in said write holding state, neither said first IO processing portion nor said second IO processing portion performs IO processing to write data to the primary volume, wherein said remote copy portion does not perform said remote copying for a volume pair in the copy halt state, wherein when setting the pair states of all other volume pairs belonging to said copy group to the copy halt state, said pair state monitoring portion changes said write holding state to a write holding release state, wherein if the logical volume complying with said received write command is a primary volume belonging to a copy group in said write holding release state, both said first IO processing portion and said second IO processing portion execute IO processing to write the write data to the primary volume, and wherein when a fixed time has elapsed from initiation of said write holding state, said pair state monitoring portion changes said write holding state to a write holding release state, regardless of whether or not the pair states of all other volume pairs belonging to said copy group are set to the copy halt state.

2. The storage system according to claim 1, further comprising:

a cache storage area;

a shared storage area;

a mainframe host I/F (interface), which is a communication interface device for communication with said mainframe host, and which receives write commands from said mainframe host and causes write data complying with the write command to be stored in said cache storage area;

an open host I/F, which is a communication interface device for communication with said open host, and which receives write commands from said open host and causes write data complying with the write command to be stored in said cache storage area;

a secondary I/F, which is a communication interface device for communication with said secondary storage systems; and a storage device I/F, which is a communication interface device for communication with two or more storage devices having said plurality of logical volumes, and which reads write data caused to be stored in said cache storage area, and writes the write data to a storage device having the logical volume which is the storage target of the write data;

wherein said first IO processing portion is comprised by said mainframe host I/F, wherein said second IO processing portion is comprised by said open host I/F, wherein said remote copy portion and said pair state monitoring portion are comprised by said secondary I/F, and wherein said write holding state and each pair state are set in said shared storage area.

3. The storage system according to claim 1, wherein another primary storage system is connected to said primary storage system, wherein at least one among the plurality of primary volumes belonging to said one copy group are comprised by said other primary storage system, and wherein if the pair state of a certain volume of said one copy group is a fault state, changed due to occurrence of a fault in the volume pair, then said pair state monitoring portion issues prescribed notification relating to the copy group to said other primary storage system comprising primary volumes belonging to the copy group.

4. The storage system according to claim 1, wherein another primary storage system is connected to said mainframe host, wherein at least one among the plurality of primary volumes belonging to said one copy group are comprised by said other primary storage system, and wherein if the pair state of a certain volume of said one copy group is said fault state or said copy halt state, then said pair state monitoring portion notifies said mainframe host, which issues write commands to the primary volume of the mainframe pair, of the change in pair state.

5. A computer system comprising:

a plurality of primary storage systems, wherein each of said plurality of primary storage systems comprises:

a plurality of logical volumes, connected to a mainframe host which is a host of a mainframe system and which transmits write commands, to an open host which is a host of an open system and which transmits write commands, and to one or more secondary storage systems comprising a plurality of secondary volumes, and which comprise at least one among a plurality of primary volumes which form a plurality of volume pairs with said plurality of secondary volumes;

a first IO processing portion, which executes IO processing to write data complying with a write command received from said mainframe host to a logical volume complying with the write command among said plurality of logical volumes;

a second IO processing portion, which executes IO processing to write data complying with a write command received from said open host to a logical volume complying with the write command among said plurality of logical volumes;

a remote copy portion, which executes remote copying to copy data to the secondary volume which forms a volume pair with the primary volume of the write data write target; and a pair state monitoring portion, which monitors pair states for each of said plurality of volume pairs, and executes control according to monitoring results; and wherein within one copy group formed by two or more volume pairs among said plurality of volume pairs, a mainframe pair, which is a volume pair the primary volume of which is a logical volume complying with a write command from said mainframe host, and an open pair, which is a volume pair the primary volume of which is a logical volume complying with a write command from said open host, are intermixed, and a plurality of primary volumes belonging to said one copy group are distributed among and comprised by said plurality of primary storage systems, wherein in a first primary storage system among said plurality of primary storage systems, when the pair state of a certain volume pair of said one copy group is a fault state which has changed due to occurrence of a fault in the volume pair, said pair state monitoring portion issues a prescribed notification relating to the copy group to a second primary storage system comprised by primary volumes belonging to the copy group, and moreover sets the write holding state for the copy group, and neither said first IO processing portion nor said second IO processing portion performs IO processing to write data to a primary volume if the logical volume complying with said received write command is a primary volume belonging to the copy group in said write holding state, wherein in said first primary storage system, said pair state monitoring portion sets the pair states of all volume pairs having primary volumes comprised by the first primary storage system and belonging to the copy group to the copy halt state, and said remote copy portion does not perform said remote copying for volume pairs in the copy halt state, wherein in said second primary storage system, said pair state monitoring portion responds to said prescribed notification from said first primary storage system, sets the copy group of the prescribed notification to the write holding state, and thereafter, said pair state monitoring portion sets the pair states of all volume pairs having primary volumes comprised by the second primary storage system, and belonging to the copy group, to the copy halt state, wherein, in each of said plurality of primary storage systems, when the pair states of volume pairs belonging to said copy group are set to the copy halt state, said pair state monitoring portion changes said write holding state to the write holding release state, and if the logical volume complying with said received write command is a primary volume belonging to a copy ground in said write holding release state, both said first IO processing portion and said second IO processing portion execute IO processing to write data to the primary volume, and wherein when a fixed time has elapsed from initiation of said write holding state, said pair state monitoring portion changes said write holding state to a write holding release state, regardless of whether or not the pair states of all other volume pairs belonging to said copy ground are set to the copy halt state.

6. A storage system, which is a primary storage system, connected to a mainframe host, which is a host in a mainframe system and which transmits write commands, an open host, which is a host in an open system and which transmits write commands, and one or more secondary storage systems, comprising a plurality of secondary volumes, and which receives write commands from said mainframe host and from said open host, comprising:

- a plurality of logical volumes, comprising a plurality of primary volumes forming a plurality of volume pairs with said plurality of secondary volumes;
- a first IO processing portion, which executes IO processing to write data, complying with a write command received from said mainframe host, to a logical volume among said plurality of logical volumes complying with the write command;
- a second IO processing portion, which executes IO processing to write data, complying with a write command received from said open host, to a logical volume among said plurality of logical volumes complying with the write command; and
- a remote communication portion, which executes remote copying to copy to a secondary volume forming a volume pair with the primary volume which is the write data write destination,
- wherein said remote communication portion monitors the pair states of each of said plurality of volume pairs, and executes control according to the monitoring results,
- wherein in one copy group formed by two or more volume pairs among said plurality of volume pairs, mainframe pairs, which are volume pairs the primary volume of which is a logical volume which complies with write commands from said mainframe host, and open pairs, which are volume pairs the primary volume of which is a logical volume which complies with write commands from said open host, are intermixed,
- wherein when the pair state of a certain volume pair in said one copy group is a fault state which has been changed due to the occurrence of a fault in the volume pair, said remote communication portion sets a write holding state for the copy group, and then sets the pair states for all other volume pairs belonging to the copy group to a copy halt state,
- wherein when a logical volume complying with a received write command is a primary volume belonging to a copy group in said write holding state, neither said first IO processing portion nor said second IO processing portion performs IO processing to write data to the primary volume,
- wherein said remote communication portion does not perform said remote copying for a volume pair in the copy halt state,
- wherein when setting the pair states of all other volume pairs belonging to said copy group to the copy halt state, said remote communication portion changes said write holding state to a write holding release state,
- wherein if the logical volume complying with said received write command is a primary volume belonging to a copy group in said write holding release state, both said first IO processing portion and said second IO processing portion execute IO processing to write the write data to the primary volume, and
- wherein when a fixed time has elapsed from Initiation of said write holding state, said remote communication portion changes said write holding state to a write holding release state, regardless of whether or not the pair states of ail other volume pairs belonging to said copy group are set to the copy halt state.

* * * * *